United States Patent
Correa et al.

Patent Number: 5,431,258
Date of Patent: Jul. 11, 1995

[54] BRAKE SHOE ASSEMBLY

[75] Inventors: Flavio D. Correa; Zomar A. de Almeida Oliveira, both of Campinas, Brazil

[73] Assignee: Allied Signal Automotive, Ltda., Brazil

[21] Appl. No.: 166,504

[22] Filed: Dec. 13, 1993

Related U.S. Application Data

[63] Continuation-in-part of Ser. No. 861,622, Apr. 1, 1992, abandoned.

[30] Foreign Application Priority Data

Apr. 12, 1991 [BR] Brazil ................... 9101551

[51] Int. Cl.⁶ ............................................. F16D 69/00
[52] U.S. Cl. ........................... 188/250 E; 188/73.37; 188/258
[58] Field of Search ........... 188/250 C, 250 A, 250 B, 188/250 D, 250 E, 250 G, 250 H, 250 R, 73.1, 73.37, 258, 261; 192/30 V

[56] References Cited

U.S. PATENT DOCUMENTS

| | | | |
|---|---|---|---|
| 1,743,412 | 1/1930 | Waite | 188/250 C |
| 2,628,693 | 2/1953 | Rodger | 188/250 G |
| 2,647,592 | 8/1953 | Tilden | 188/250 G |
| 2,658,473 | 11/1953 | Hunt | 188/261 |
| 3,722,634 | 3/1973 | Ogasawara et al. | 188/73.37 |
| 4,022,302 | 5/1977 | Janssen | 188/73.37 X |
| 5,099,961 | 3/1992 | Dreilich et al. | 188/73.37 X |

FOREIGN PATENT DOCUMENTS

| | | | |
|---|---|---|---|
| 540168 | 4/1957 | Canada | 188/261 |
| 743265 | 11/1943 | Germany | 188/250 C |
| 2259770 | 6/1973 | Germany | 188/250 E |
| 436470 | 10/1935 | United Kingdom | 188/250 E |

*Primary Examiner*—Robert J. Oberleitner
*Assistant Examiner*—Alfred Muratori

[57] ABSTRACT

A brake shoe assembly is provided in which the brake shoe table has at least one longitudinal channel running along the upper surface thereof. A generally smooth arcuate brake shoe lining is fastened to the table, so that a longitudinal chamber is formed comprising the channel and the portion of the bottom surface of the lining which covers the channel. The chamber is constructed so as to affect the natural excitation frequency of the brake shoe to be outside the range of the excitation frequency of the brake drum, to thereby reduce or eliminate resonance of the two frequencies upon actuation of the brake.

14 Claims, 9 Drawing Sheets

BRAKE SHOE ASSEMBLY

This application is a continuation-in-part of U.S. application Ser. No. 07/861,622, filed Apr. 1, 1992, now abandoned.

BACKGROUND OF THE INVENTION

The present invention relates to an automobile brake shoe assembly. In particular, the invention relates to a brake shoe assembly which is fashioned so as to reduce vibratory noise caused upon application of the brake shoe against the brake drum in a moving vehicle.

In general, brake shoes comprise an arcuate supporting table having a conforming brake lining fastened thereto by rivets. The table is generally formed with a smooth concave upper surface, so that the smooth bottom concave surface of the lining can be tightly fastened thereon, and can fully contact the entire surface of the brake shoe table.

Despite the widespread use of this typical brake shoe, there is a serious and chronic drawback resulting from the unpleasant noise arising when the brake is actuated. This noise results directly from the frictional contact between the brake shoe and the brake drum. However, the basic cause of the noise is a vibratory sound phenomenon known as "squeal". This phenomenon occurs as the brakes are actuated at a certain speed and pressure. The excitation caused by the frictional contact between the brake shoe and the brake drum results in each of the elements vibrating at a certain natural frequency, dependent upon the speed and pressure, and materials used. When the frequencies of the brake shoe and the brake drum are coincidental, resonance occurs and the noise level becomes amplified resulting in squeal. Often, the resulting squeal is so loud as to cause extreme aural discomfort to those in and around the vehicle.

It is therefore an object of the present invention to provide a brake shoe which is capable of reducing or eliminating squeal, regardless of the vehicle speed or actuation pressure of the brake assembly.

It is a further object of the present invention to provide a brake shoe having an excitation frequency which is out of the range of the excitation frequency of the brake drum so as to prevent resonance.

SUMMARY OF THE INVENTION

Accordingly, there is provided a brake shoe in which the brake shoe table has at least one longitudinal channel running along the upper surface thereof. A generally smooth arcuate brake shoe lining is fastened to the table, so that a longitudinal chamber is formed comprising the channel and the portion of the bottom surface of the lining which covers the channel. The chamber is constructed so as to affect the natural excitation frequency of the brake shoe to be outside the range of the excitation frequency of the brake drum, to thereby reduce or eliminate resonance of the two frequencies upon actuation of the brake.

DETAILED DESCRIPTION OF THE INVENTION

Figure 5:
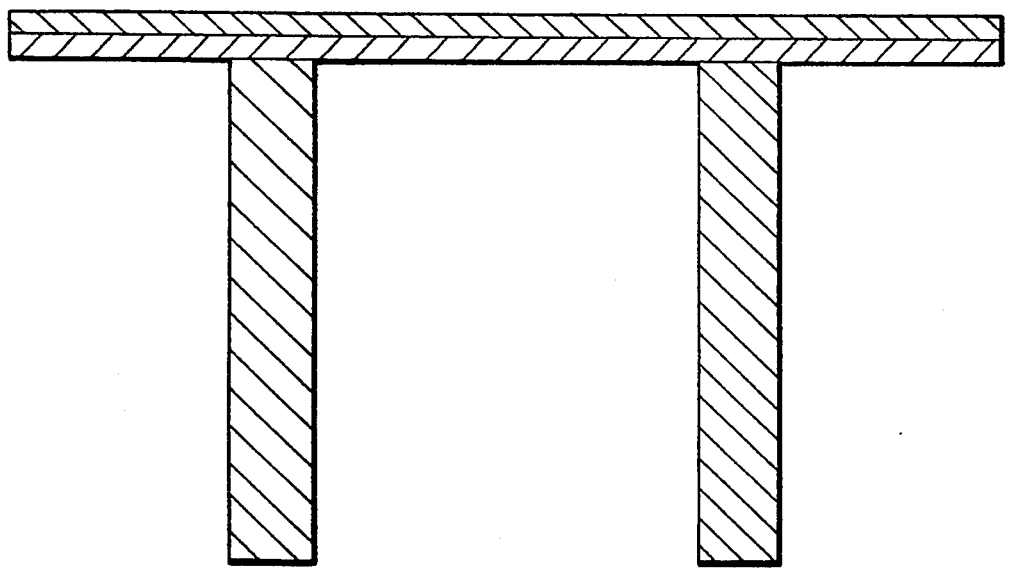
FIG. 5 is a front cross-sectional view of a prior art brake shoe table and lining assembly.
Figure 6:
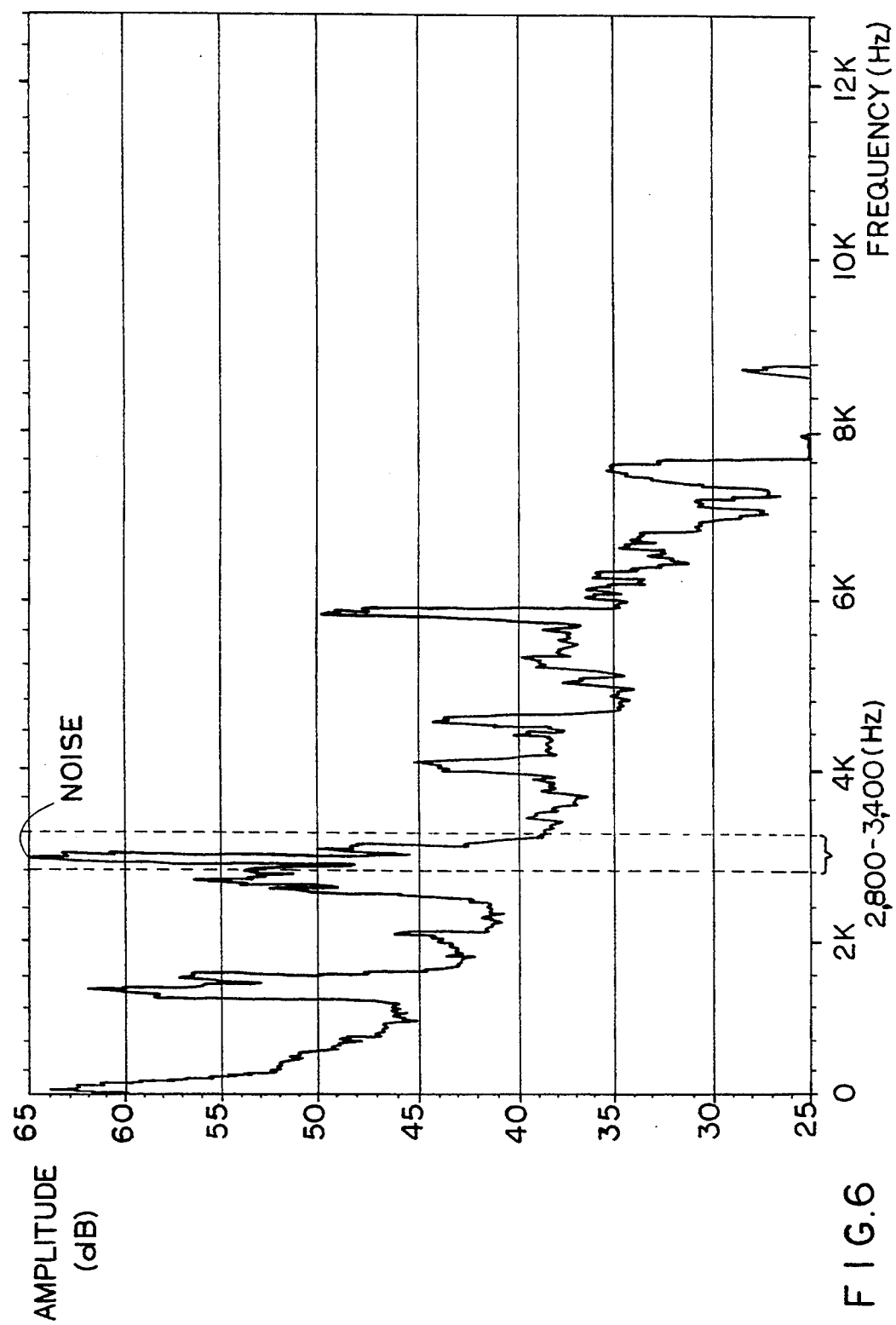
FIG. 6 is a graph showing median noise values of the prior art brake shoe.
Figure 8:
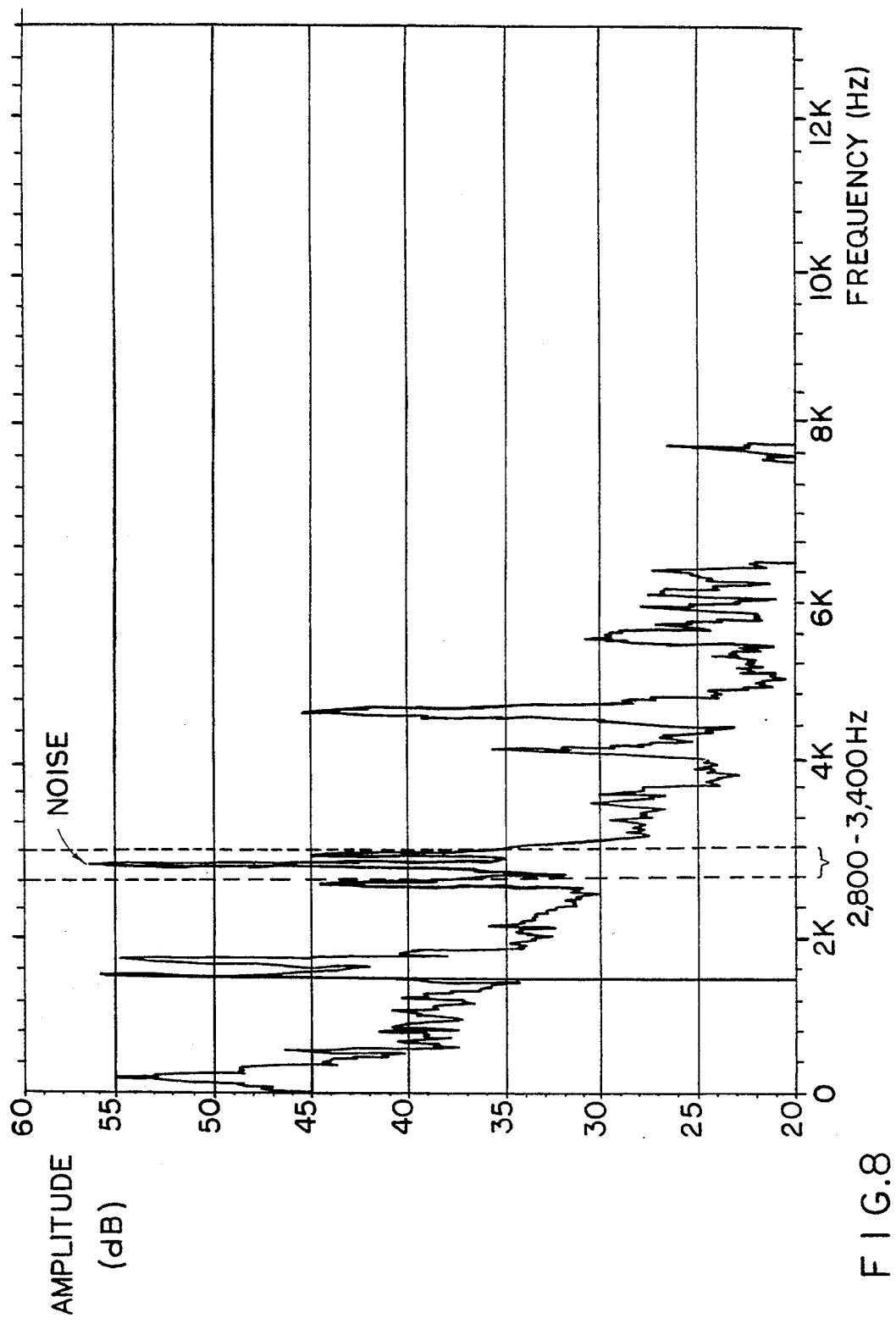
FIG. 8 is a graph showing a sample noise value measurement of a prior art brake shoe.

In order to achieve an elimination of the problem of squeal in brake assemblies, the applicant performed acoustical analysis with respect to the problematic prior art brake shoe assembly (shown in FIG. 5). The natural frequency of various parts was measured in order to isolate the part causing squeal. The frequencies measured ranged from 0 to 12,800 hertz. One important finding was that both the brake shoe and the brake drum had a natural frequency in the range 2800-3300 hertz. Upon actuation of the brake, the excitation frequencies of the shoe and drum resonated, resulting in an undesirable amplification of frequencies leading to squeal. FIGS. 6 and 8 illustrate the region of resonance in the prior art brake assembly.

In order to eliminate the problem of squeal, it was determined that the brake shoe must be constructed so that its natural frequency was out of the range of the frequency of the brake drum. To achieve this, the applicant discovered that by forming a chamber within the brake shoe assembly, the natural excitation frequency could be shifted out of resonance range. However, since a brake shoe must be a relatively inexpensive component of a vehicle, it was necessary to keep the construction simple, while maintaining the structural integrity of the shoe.

Figure 1:
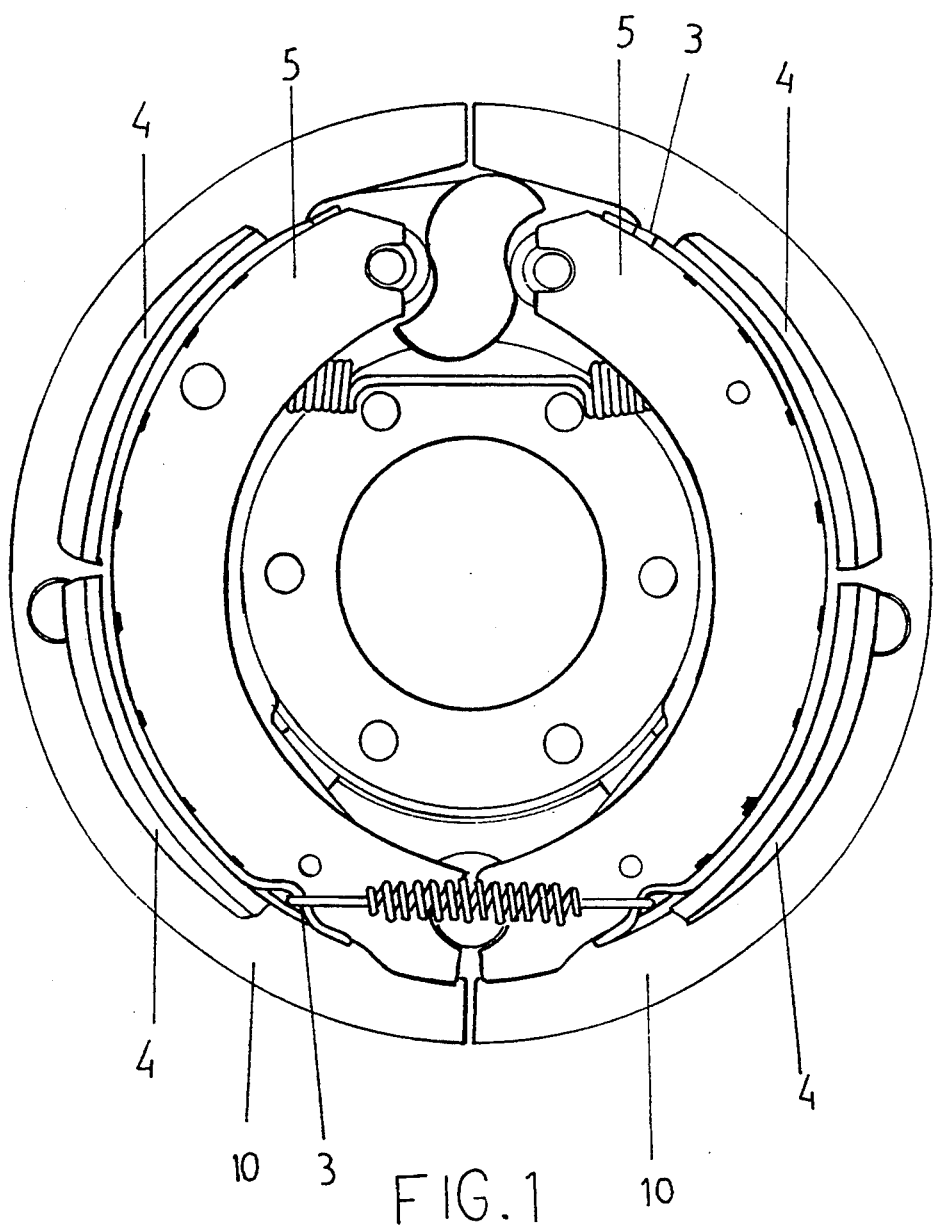
FIG. 1 is a side plan view of a brake shoe assembly of the present invention, with a brake actuating mechanism.
Figure 2:
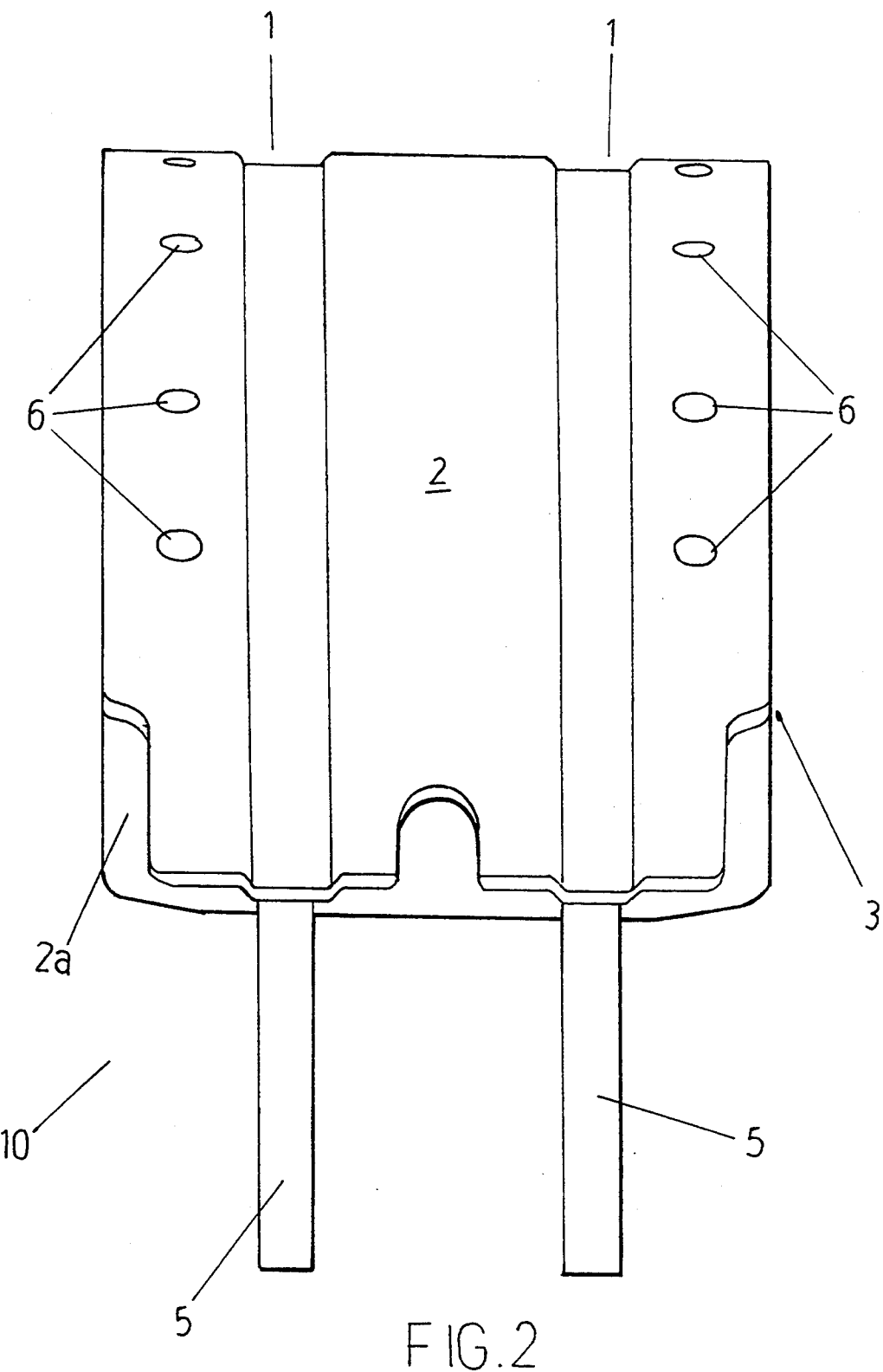
FIG. 2 is a front plan view of a brake shoe table of the invention.
Figure 3:
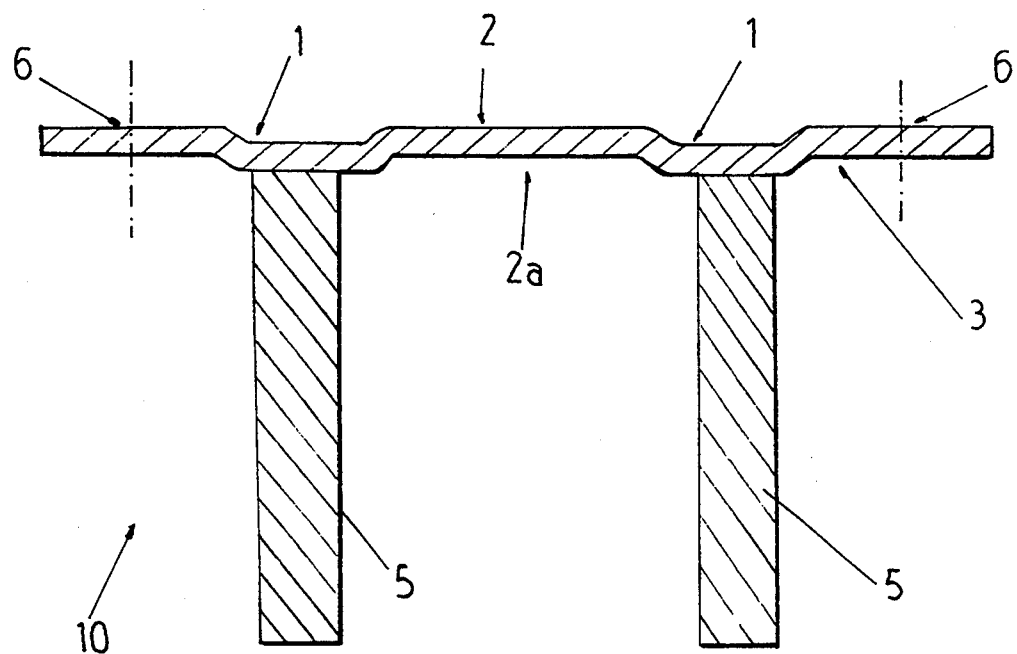
FIG. 3 is a front cross-sectional view of one embodiment of a brake shoe table and lining assembly of the invention.
Figure 4:
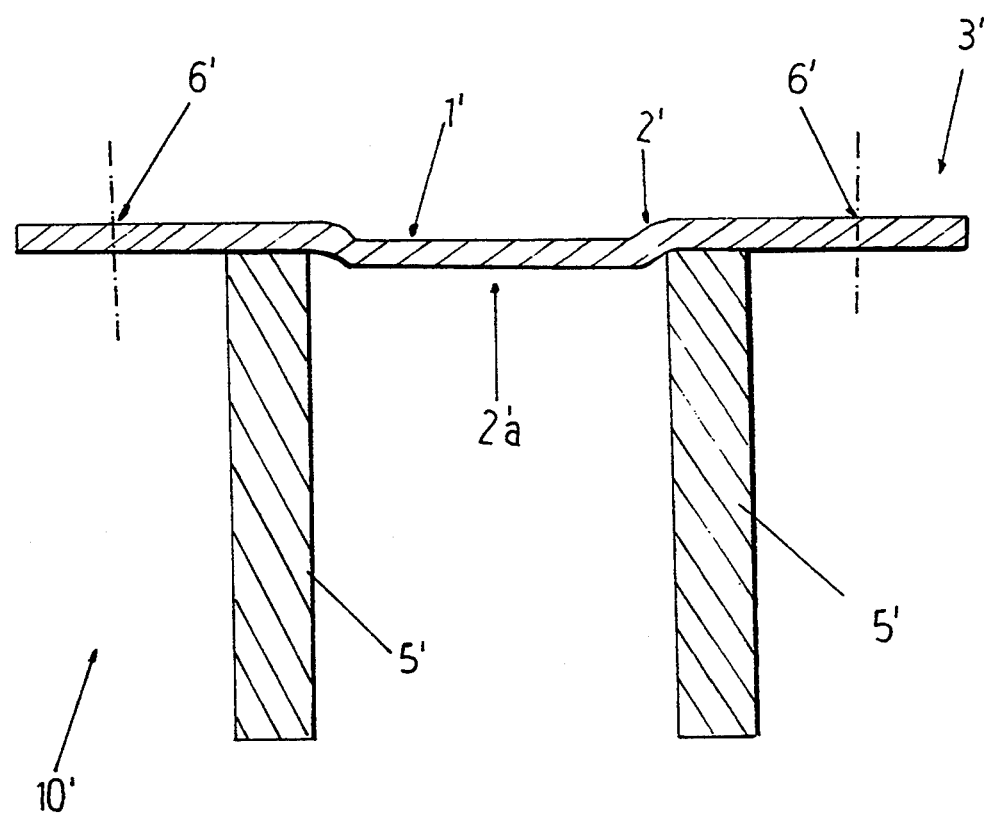
FIG. 4 is a front cross-sectional view of another embodiment of a brake shoe table and lining assembly of the invention.

With reference to FIG. 2, the table 3 is an arcuate solid member having a convex upper surface 2. As seen in FIGS. 2-4, the table 3 is generally uniform in lateral cross-section. At least one longitudinal channel 1 is formed in the upper surface 2 of the table 3 as a depression in the table. The channel 1 may be formed by any known metal forming means, such as stamping or welding. However, the channel sides 12 and bottom 13 should be integral with the table 3, and should have the same thickness and strength as the table 3 so as to maintain structural stability.

One particular advantage of the design of the brake shoe table of the invention is that it can accommodate a standard brake shoe lining, which is usually a simple arcuate frictional element having a straight lateral cross-section uniform in the longitudinal direction. The brake shoe lining 4, the bottom surface 16 of which conform to the radius of the receiving surface 17, is fastened to the receiving surface 17 of the upper surface 2 of the table 3 by ordinary means such as rivets. The receiving surface 17 is characterized by a cross-sectional profile being composed of colinear straight line segments. The brake shoe table is supported within the brake assembly by a web 5 fastened to the bottom of the table. Since the lining 4 has a straight lateral cross-section, while the table has a channel in lateral cross-section, a longitudinal chamber 15 is formed in the brake shoe, comprising the channel sides 12 and bottom 13 surface, and the bottom surface 16 of the lining 4. FIG. 3 shows a two chamber embodiment and FIG. 4 shows a one chamber embodiment. It is preferable that the chambers be oriented symmetrically, so that for the one chamber embodiment, the chamber is located centrally, while for the two chamber embodiment, the two chambers are of similar construction, and run parallel to each other and equidistant from the lateral center. Preferably, rivet holes 6 in the table 3 are also located symmetrically so as not to disturb the natural frequency of the table achieved by the particular chamber formation.

Figure 7:
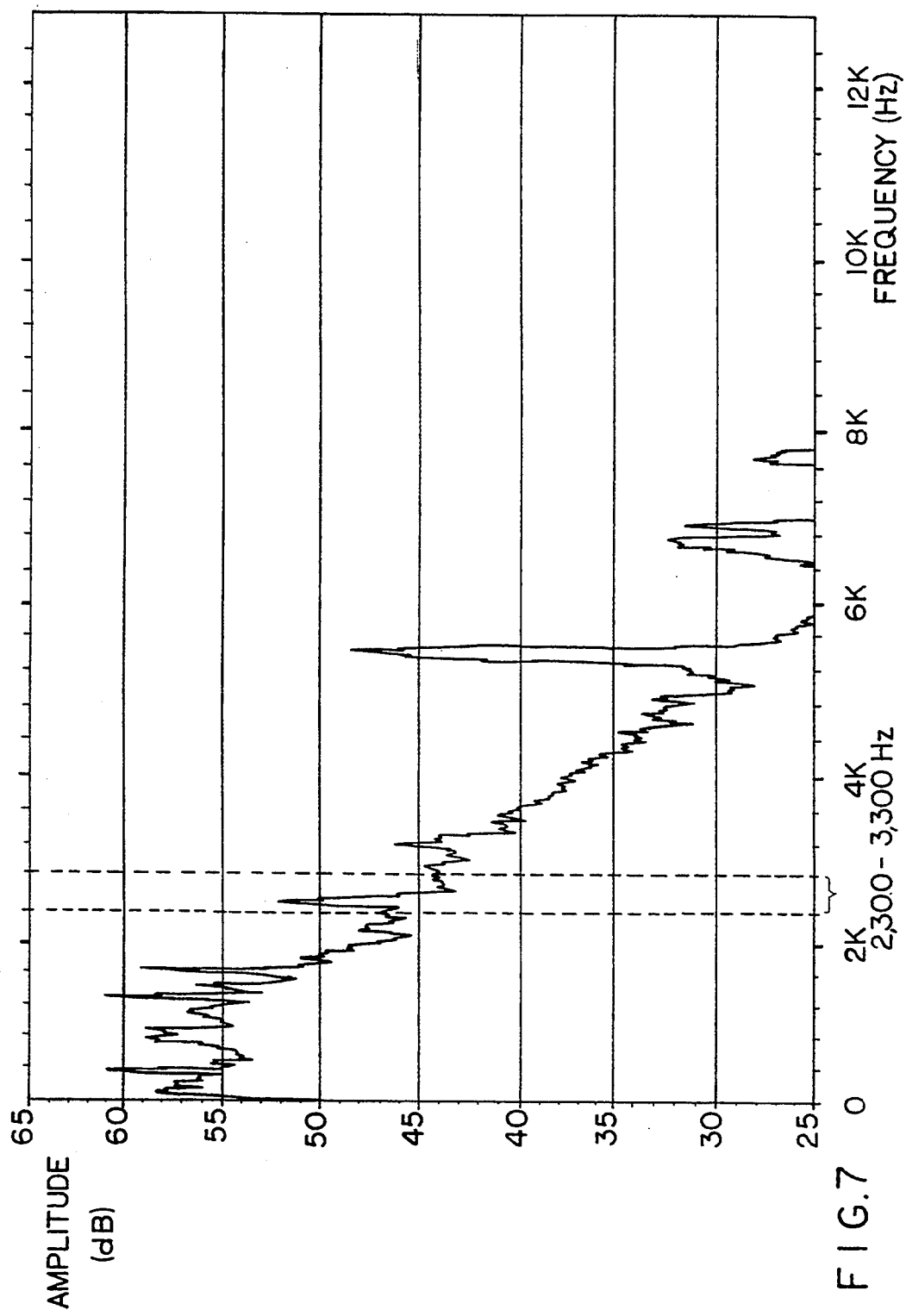
FIG. 7 is a graph showing median noise values of the brake shoe of the invention.
Figure 9:
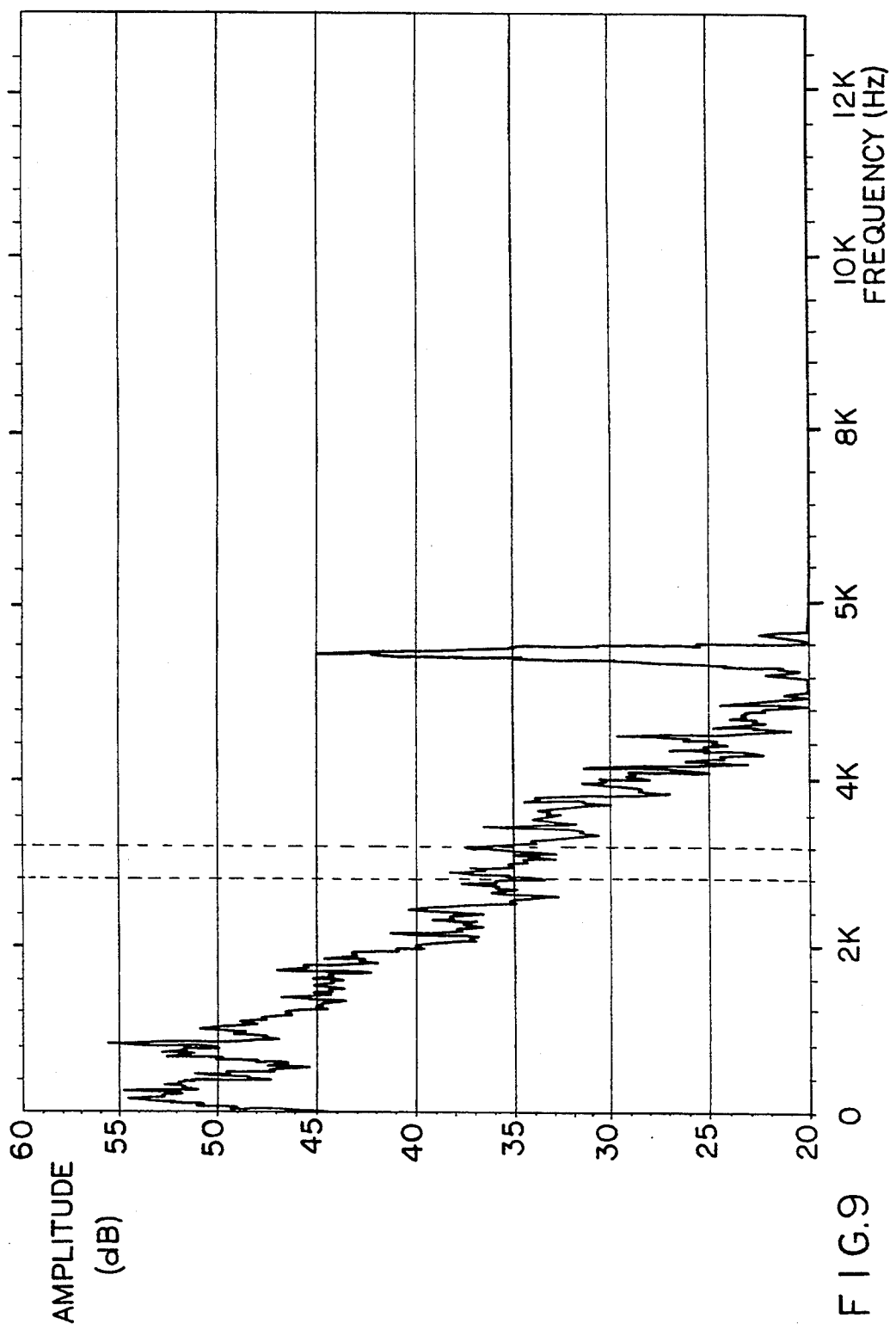
FIG. 9 is a graph showing a sample noise value measurement of a brake shoe of the invention.

In order to demonstrate the effectiveness of the claimed brake shoe assembly over the prior art assembly (brake shoe A), comparative tests were performed using 15 inch brake shoes. A brake shoe table (brake shoe B) was constructed having two parallel channels, as shown generally in FIG. 3. The channels were formed equidistant from the lateral center of the table. The distance between the center points A and B of the channels was approximately 45% of the width of the table. The width of the channel, measured from one side thereof to the other, was approximately 12.5% of the width of the table. The depth of the channel, measured from the channel bottom surface to the upper surface of the table, was approximately 2.5% of the width of the table. A standard brake shoe lining was fastened to the table upper surface by means of rivets to form two longitudinal chambers. Tests were run on a 14-ton Ford ® cargo truck in actual service, with acoustical measurements taken with a dynamometer. The prior art brake shoe A discussed above provided an excessive amount of resonance, as shown by FIGS. 6 and 8. However, when brake shoe B was installed in the truck, the excitation frequency of the shoe was measured at 2300–2600 hertz, out of the range of the frequency of the brake drum. As seen in FIGS. 7 and 9, this results in an elimination of the resonance problem.

Figure 10:
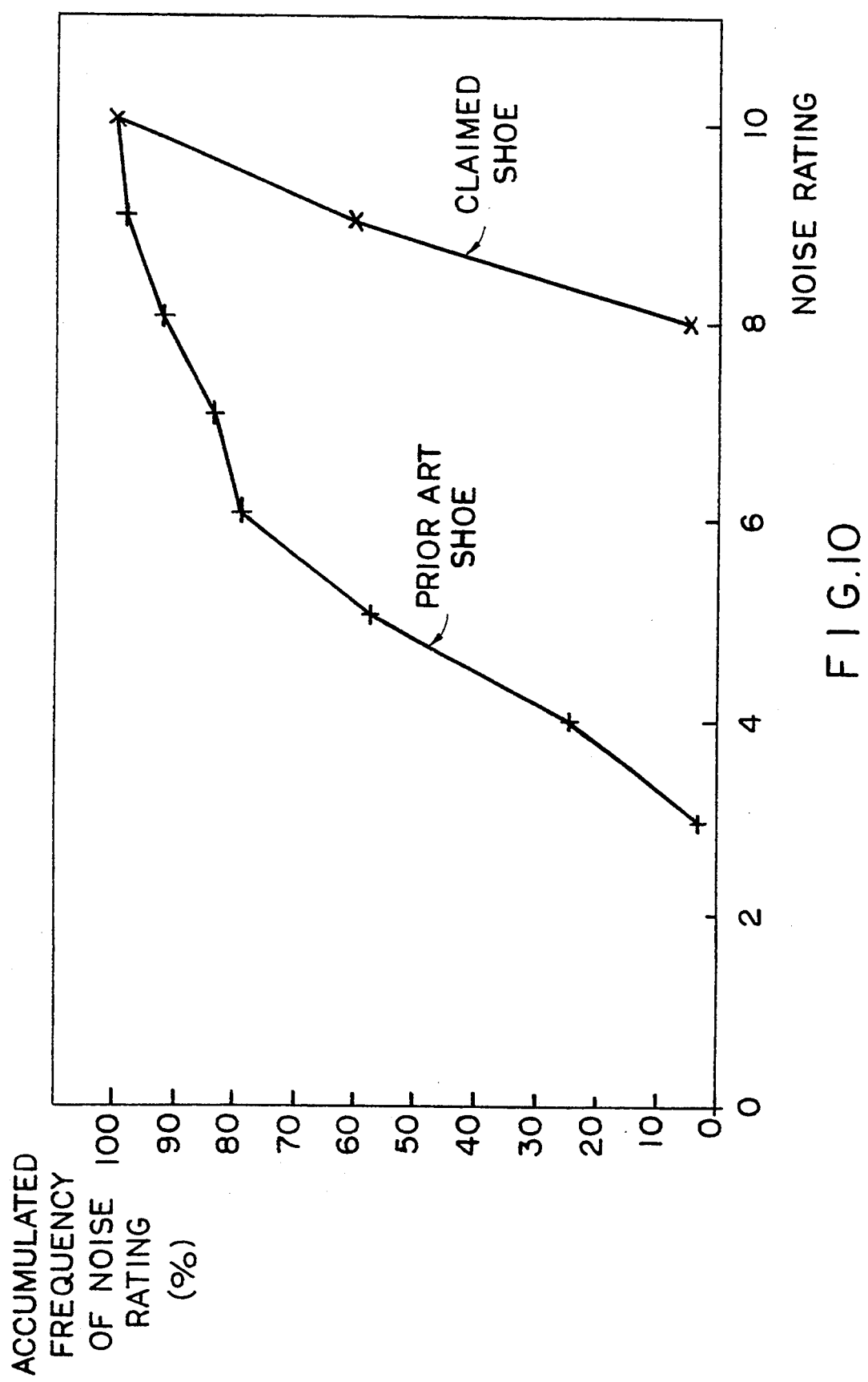
FIG. 10 is a graph showing comparative subjective noise values of the prior art brake shoe and the brake shoe of the invention.

Subjective comparative tests were also run, with ratings being assigned from zero (excessive squeal) to ten (no perceptible squeal). A rating of less than six was deemed to be unsatisfactory. The results are shown in the following table, and shown graphically in FIG. 10.

|  | Prior Art | |
| --- | --- | --- |
|  | Shoe A | Shoe B |
| Average rating | 5.9 | 8.7 |
| Minimum rating | 2 | 5 |

While the construction of the brake shoe used in the above tests was found to be particularly effective, it is contemplated that the invention should not be limited to the specific orientation and size ranges used in the embodiment. For example, it has been found that an effective formation for the location and width of the channels with respect to the width of the table, can be in the range of 10 to 15% for the width of the channels, and 40 to 50% for the distance between the centers of the channels, while the depth of the channel should always be approximately 2.5% of the width of the table. Similarly, for a single channel embodiment, the depth of the channel should be approximately 2.5%, while the width of the centrally located channel should be in the range of approximately 22.5 to 27.5%, and preferably 25%.

Based upon the novel concepts set forth above, those skilled in the art will be able to construct chambers of differing orientations which affect the natural frequency of the shoe so as to be outside of the range of the frequency of the drum, and hence reduce or eliminate brake squeal.

What is claimed is:

1. A brake shoe assembly of a braking system for automobiles, comprising:
   (a) an integral arcuate table having a uniform thickness, the table comprising an upper surface having a lateral cross-section generally uniform throughout its length, the upper surface comprising
      (1) a receiving surface having a cross-sectional profile along a straight line, and
      (2) at least one longitudinal channel in the table surface integrally running the length thereof, the channel comprising a bottom portion and side portions, and the channel being open at its top,
   (b) a brake shoe lining, the bottom surface of which conforms to the receiving surface, the lining being fastened to the receiving surface at attachment points located thereon so as to cover the top of the channel, and
   (c) a means for altering a natural vibratory frequency of the brake shoe assembly, said means comprising at least one hollow longitudinal chamber, said chamber comprising the channel and the portion of the bottom surface of the lining which covers the channel, said chamber being of such dimension and orientation so as to alter the frequency of the brake shoe assembly so as to be out of range of a natural vibratory frequency of a brake drum, said channel having a depth of approximately 2.5% with respect to the width of the table.

2. The brake shoe assembly of claim 1, wherein the means comprises a single channel located at the center of the table.

3. The brake shoe assembly of claim 2, wherein the channel has a width of approximately 22.5 to 27.5% with respect to the width of the table.

4. The brake shoe assembly of claim 3, wherein the channel has a width of approximately 25% with respect to the width of the table.

5. The brake shoe assembly of claim 1, wherein the means comprises two parallel channels of equal dimension and located equidistant from the center of the table.

6. The brake shoe assembly of claim 5, wherein the channels each have a width of approximately 10 to 15% with respect to the width of the table, and the centers of the channels are located at a distance from each other of approximately 40 to 50% with respect to the width of the table.

7. The brake shoe assembly of claim 6, wherein the channels each have a width of approximately 12.5% with respect to the width of the table, and the centers of the channels are located at a distance from each other of approximately 45% with respect to the width of the table.

8. A brake assembly of a braking system for automobiles, comprising in combination a brake shoe assembly and a brake drum, the brake drum having a natural vibratory frequency, the brake shoe assembly comprising:

(a) an integral arcuate table having a uniform thickness, the table comprising an upper surface having a lateral cross-section generally uniform throughout its length, the upper surface comprising
  (1) a receiving surface having a cross-sectional profile along a straight line, and
  (2) at least one longitudinal channel in the table surface integrally running the length thereof, the channel comprising a bottom portion and side portions, and the channel being open at its top,
(b) a brake shoe lining, the bottom surface of which conforms to the receiving surface, the lining being fastened to the receiving surface at attachment points located thereon so as to cover the top of the channel, and
(c) a means for altering a natural vibratory frequency of the brake shoe assembly, said means comprising at least one hollow longitudinal chamber, said chamber comprising the channel and the portion of the bottom surface of the lining which covers the channel, said chamber being of such dimension and orientation so as to alter the frequency of the brake shoe assembly so as to be out of range of a natural vibratory frequency of the brake drum, said channel having a depth of approximately 2.5% with respect to the width of the table.

9. The brake assembly of claim 8, wherein the means comprises a single channel located at the center of the table.

10. The brake shoe assembly of claim 9, wherein the channel has a width of approximately 22.5 to 27.5% with respect to the width of the table.

11. The brake shoe assembly of claim 10, wherein the channel has a width of approximately 25% with respect to the width of the table.

12. The brake assembly of claim 8, wherein the means comprises two parallel channels of equal dimension and located equidistant from the center of the table.

13. The brake assembly of claim 12, wherein the channels each have a width of approximately 10 to 15% with respect to the width of the table, and the centers of the channels are located at a distance from each other of approximately 40 to 50% with respect to the width of the table.

14. The brake assembly of claim 13, wherein the channels each have a width of approximately 12.5% with respect to the width of the table, and the centers of the channels are located at a distance from each other of approximately 45% with respect to the width of the table.

* * * * *

UNITED STATES PATENT AND TRADEMARK OFFICE
CERTIFICATE OF CORRECTION

PATENT NO. : 5,431,258

DATED : Jul. 11, 1995

INVENTOR(S) : Flavio D. Correa; Zomar A. de Almeida Oliveira

It is certified that error appears in the above-indentified patent and that said Letters Patent is hereby corrected as shown below:

The title page, showing an illustrative figure, should be deleted and substitute therefor the attahced title page.

Signed and Sealed this

Fourteenth Day of November, 1995

Attest:

BRUCE LEHMAN

Attesting Officer     Commissioner of Patents and Trademarks

United States Patent [19]

Correa et al.

[11] Patent Number: 5,431,258
[45] Date of Patent: Jul. 11, 1995

[54] BRAKE SHOE ASSEMBLY

[75] Inventors: Flavio D. Correa; Zomar A. de Almeida Oliveira, both of Campinas, Brazil

[73] Assignee: Allied Signal Automotive, Ltda., Brazil

[21] Appl. No.: 166,504

[22] Filed: Dec. 13, 1993

Related U.S. Application Data

[63] Continuation-in-part of Ser. No. 861,622, Apr. 1, 1992, abandoned.

[30] Foreign Application Priority Data

Apr. 12, 1991 [BR] Brazil ............................ 9101551

[51] Int. Cl.⁶ .................................... F16D 69/00
[52] U.S. Cl. ............................ 188/250 E; 188/73.37; 188/258
[58] Field of Search .......... 188/250 C, 250 A, 250 B, 188/250 D, 250 E, 250 G, 250 H, 250 R, 73.1, 73.37, 258, 261; 192/30 V

[56] References Cited

U.S. PATENT DOCUMENTS

| | | | |
|---|---|---|---|
| 1,743,412 | 1/1930 | Waite | 188/250 C |
| 2,628,693 | 2/1953 | Rodger | 188/250 G |
| 2,647,592 | 8/1953 | Tilden | 188/250 G |
| 2,658,473 | 11/1953 | Hunt | 188/261 |
| 3,722,634 | 3/1973 | Ogasawara et al. | 188/73.37 |
| 4,022,302 | 5/1977 | Janssen | 188/73.37 X |
| 5,099,961 | 3/1992 | Dreilich et al. | 188/73.37 X |

FOREIGN PATENT DOCUMENTS

| | | | |
|---|---|---|---|
| 540168 | 4/1957 | Canada | 188/261 |
| 743265 | 11/1943 | Germany | 188/250 C |
| 2259770 | 6/1973 | Germany | 188/250 E |
| 436470 | 10/1935 | United Kingdom | 188/250 E |

*Primary Examiner*—Robert J. Oberleitner
*Assistant Examiner*—Alfred Muratori

[57] ABSTRACT

A brake shoe assembly is provided in which the brake shoe table has at least one longitudinal channel running along the upper surface thereof. A generally smooth arcuate brake shoe lining is fastened to the table, so that a longitudinal chamber is formed comprising the channel and the portion of the bottom surface of the lining which covers the channel. The chamber is constructed so as to affect the natural excitation frequency of the brake shoe to be outside the range of the excitation frequency of the brake drum, to thereby reduce or eliminate resonance of the two frequencies upon actuation of the brake.

14 Claims, 9 Drawing Sheets

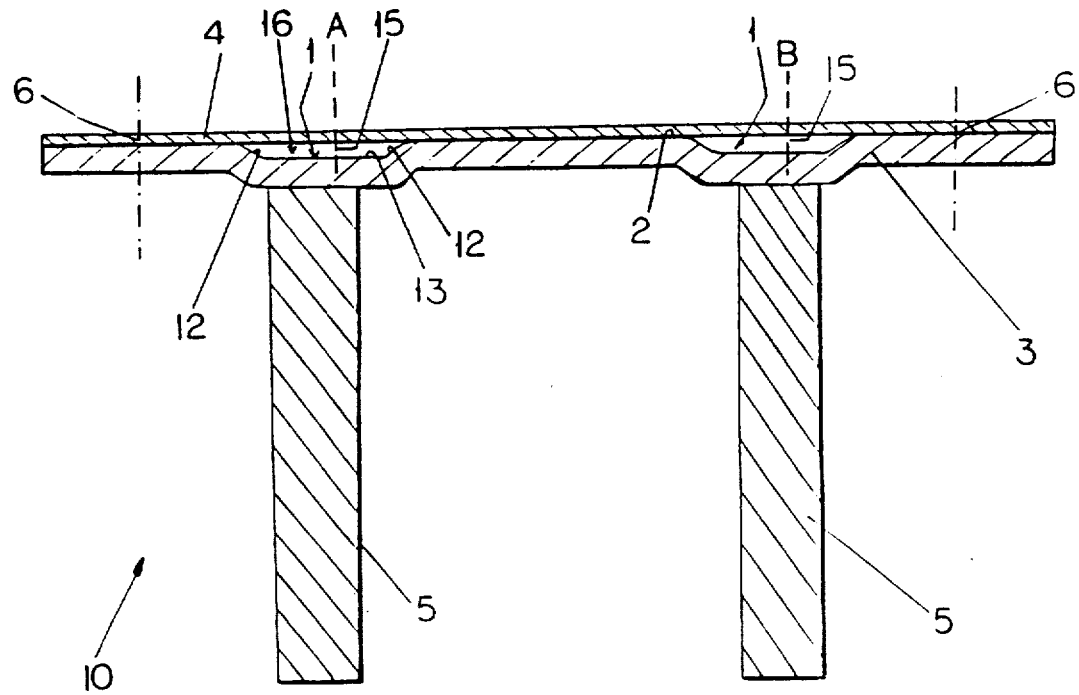

UNITED STATES PATENT AND TRADEMARK OFFICE
CERTIFICATE OF CORRECTION

PATENT NO. : 5,431,258

DATED : Jul. 11, 1995

INVENTOR(S) : Flavio D. Correa; Zomar A. de Almeida Oliveira

It is certified that error appears in the above-indentified patent and that said Letters Patent is hereby corrected as shown below:

In the drawings, Sheet 3 of 9 should appear as follows:

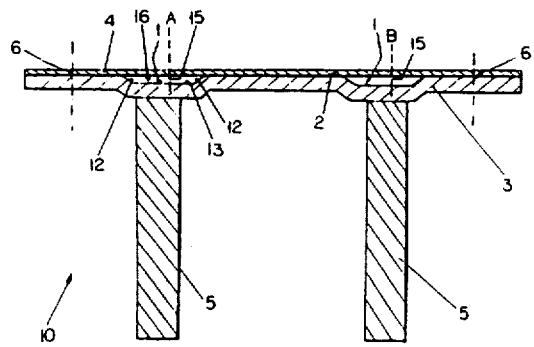

FIG. 3

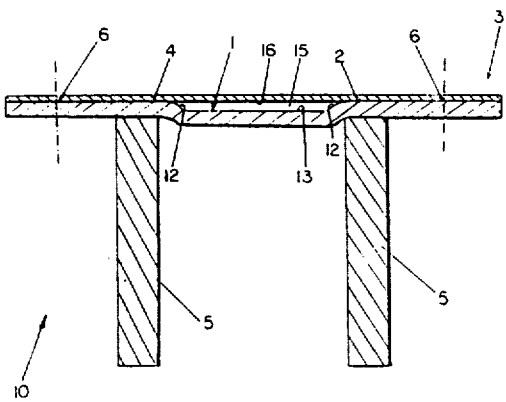

FIG. 4